United States Patent [19]

Sasaki et al.

[11] Patent Number: 5,359,764
[45] Date of Patent: Nov. 1, 1994

[54] METHOD FOR DISASSEMBLING AND ASSEMBLING A MOLD

[75] Inventors: Nobuki Sasaki, Ibaraki; Shigeo Negataki, Yokohama, both of Japan

[73] Assignee: Canon Kabushiki Kaisha, Tokyo, Japan

[21] Appl. No.: 905,408

[22] Filed: Jun. 29, 1992

[30] Foreign Application Priority Data

Jul. 10, 1991 [JP] Japan .................. 3-195061
May 13, 1992 [JP] Japan .................. 4-146963

[51] Int. Cl.$^5$ ............................. B23P 19/04
[52] U.S. Cl. ...................... 29/426.6; 29/468; 164/347
[58] Field of Search ........... 29/426.5, 426.6, 464, 29/468; 164/137, 340, 342, 344, 345, 347, 339; 425/190

[56] References Cited

U.S. PATENT DOCUMENTS

| | | | |
|---|---|---|---|
| 2,955,335 | 10/1960 | Morgenstern | 164/347 X |
| 3,161,918 | 12/1964 | Zearbaugh | 164/347 |
| 3,209,415 | 10/1965 | King | 164/347 X |
| 3,442,323 | 5/1969 | Lewis et al. | 164/347 X |
| 3,899,282 | 8/1975 | Jesse | 164/344 X |
| 3,938,585 | 2/1976 | Rader | 164/347 |

FOREIGN PATENT DOCUMENTS 242369 11/1990 Japan .

*Primary Examiner*—Peter Dungba Vo
*Attorney, Agent, or Firm*—Fitzpatrick, Cella, Harper & Scinto

[57] ABSTRACT

A method for disassembling and assembling a mold enables a return pin to be safely attached or detached against an elastic force of the return spring. The fitting length between the return pin and the sliding hole formed in the movable mold plate is so determined that a fitting state of a predetermined length remains between the return pin and the sliding hole when the elastic force of the return spring is released to a practically safe level, and the return pin has, at the end, a threaded hole for fitting an operation male screw to be used for disassembling and assembling of the mold. While the male screw is screwed into the threaded hole through the sliding hole from the fixed side, the male screw is fed to move the return pin in the sliding hole, until the elastic force of the return spring is released to a practically safe level.

8 Claims, 7 Drawing Sheets

METHOD FOR DISASSEMBLING AND ASSEMBLING A MOLD

BACKGROUND OF THE INVENTION

1. Field of the Invention

The present invention relates to a mold for injection molding resin or the like, an apparatus for disassembling and assembling the same and a method for said disassembling and assembling.

2. Related Background Art

The above-mentioned mold, which is often disassembled and assembled for the purpose of in-service inspection and repair, is constructed so that a movable mold plate is positioned opposite to a fixed mold plate, and a return pin extends through the movable mold plate to allow its end to face the fixed mold plate and is slidably fitted with the movable mold plate. A return spring is provided between an ejector plate supporting an ejector pin and the movable mold plate. Therefore, upon removing a movable side mounting plate from the movable mold plate in order to disassemble the mold, said return spring functions so as to expel the ejector plate supporting the ejector pin, thereby causing considerable danger and also eventually causing damage to the components.

For this reason it has been practiced, as shown in FIG. 7, that the ejector plate 105 (composed of two plates 105a, 105b in the illustrated case) is provided with a penetrating hole 112, 113 accessible through a penetrating hole 111 formed in a movable side mounting plate 107 and the movable mold plate 101 is provided with a threaded hole 114. A bolt 110 is screwed into said threaded hole 114 through the penetrating holes 111, 112, 113 prior to the disassembling of the mold, thereby allowing the movable mold plate 101 to support said ejector plate 105. Therefore, the ejector plate 105 is not expelled by elastic force of the return spring 106 when said movable side mounting plate 107 is detached. Subsequently an ejector pin 104 is removed, and the return spring 106 is loosened while the bolt 110 is unscrewed, thereby extracting the return pin 103 from the movable mold plate 101.

However, such construction increases the cost of the mold, because the threaded hole 114 and the through holes 111, 112, 113 have to be formed in the movable mold plate 101, ejector plate 105 and mounting plate 107, respectively, so as to pass the bolt 110 therethrough and secure it in order to support the ejector plate 105. Also, since the mounting position of said bolt 110 does not coincide with the line of elastic force of the return spring 106, the elastic force applied to the ejector plate 105 is unbalanced, and it is cumbersome and difficult to remove the return pin 103 while the bolt 110 is unscrewed.

SUMMARY OF THE INVENTION

In consideration of the foregoing, the present invention provides a molding mold allowing to smoothly attach or detach the return pin against the elastic force of the return spring, without particular working on the members of the mold. It also provides a disassembling and assembling apparatus for said mold, and a method for such disassembling and assembling.

The molding mold of the present invention comprises a movable mold plate positioned opposite to a fixed mold plate, said mold plates respectively supporting mutually opposed mold members to define a cavity therebetween, a return pin slidably fitted in and extending through a sliding hole provided in said movable mold plate and having the end positioned at the fixed mold plate, and a return spring provided between an ejector plate for supporting an ejector pin and said movable mold plate, wherein the fitting length between said return pin and said sliding hole is determined such that the fitting state of a predetermined length remains therebetween when the elastic force of said return spring is released to a practically safe level, and said return pin is provided at the other end thereof with a threaded hole for engaging with an operation male screw to be used upon assembling and disassembling of the mold, whereby said operation male screw is screwed into said threaded hole through said sliding hole from the fixed side and is fed to move said return pin in said sliding hole until the elastic force of said return spring is released to a practically safe level.

Also, the assembling/disassembling apparatus of the present invention, for a molding mold comprises a movable mold plate positioned opposite to a fixed mold plate, said mold plates respectively supporting mutually opposed mold members to define a cavity therebetween, a return pin extending through and slidably fitted in a sliding hole provided in said movable mold plate and ending at the fixed mold plate, a return spring provided between an ejector plate for supporting an ejector pin and said movable mold plate, a male screw to be screwed in a threaded hole provided on the other end of said return pin, a space to contact with said movable mold plate in a relationship opposed to the fixed side, and a nut fitted on said male screw for pressing said spacer to said movable mold plate, wherein the rotation of said nut permits feeding of said male screw while said return pin is maintained against the elastic force of said return spring, thereby releasing said elastic force to a practically safe level.

In another aspect, the assembling/disassembling apparatus of the present invention for the molding mold comprises a male screw to be screwed in a threaded hole provided on the other end of said return pin, and a spacer to contact with said movable mold plate in a relationship opposed to the fixed side and to be pressed by the head portion of said male screw, wherein said male screw is at first rotated so as to be screwed in the threaded hole of said return pin, and is then rotated in the opposite direction so as to displace said male screw while the return pin is maintained against the elastic force of said return spring, thereby releasing said elastic force to a practically safe level.

Also, the assembling/diassembling method of the present invention for the molding mold comprises the steps of screwing a male screw into a threaded hole provided on the other end of said return pin, and moving said male screw while said return pin is maintained against the elastic force of said return spring, thereby feeding said return pin in said sliding hole until the elastic force of said return spring is released to a practically safe level.

Also, the present invention provides a method for disassembling a molding mold including:
 a pair of mold members having a cavity for molding a product;
 fixed and movable mold plate members for supporting said mold members, respectively;
 mounting members for supporting said mold plate members;

an ejector pin for ejecting the molded product and an ejector plate for supporting said ejector pin;

a return pin mounted on said ejector plate, and having its end inserted into a hole formed in one of said mold plate members and positioned at an interface of the other of said mold plate members; and a return spring for applying an elastic force to said return pin; said method featuring, for the purpose of eliminating the elastic force of the return spring applied to the return pin upon disassembling of the mold, feeding said return pin in a direction to be detached from the mold plate member, thereby maintaining a sufficient distance between the ejector plate and the mold plate member for eliminating said elastic force of the return spring.

DESCRIPTION OF THE PREFERRED EMBODIMENTS

Figure 1:
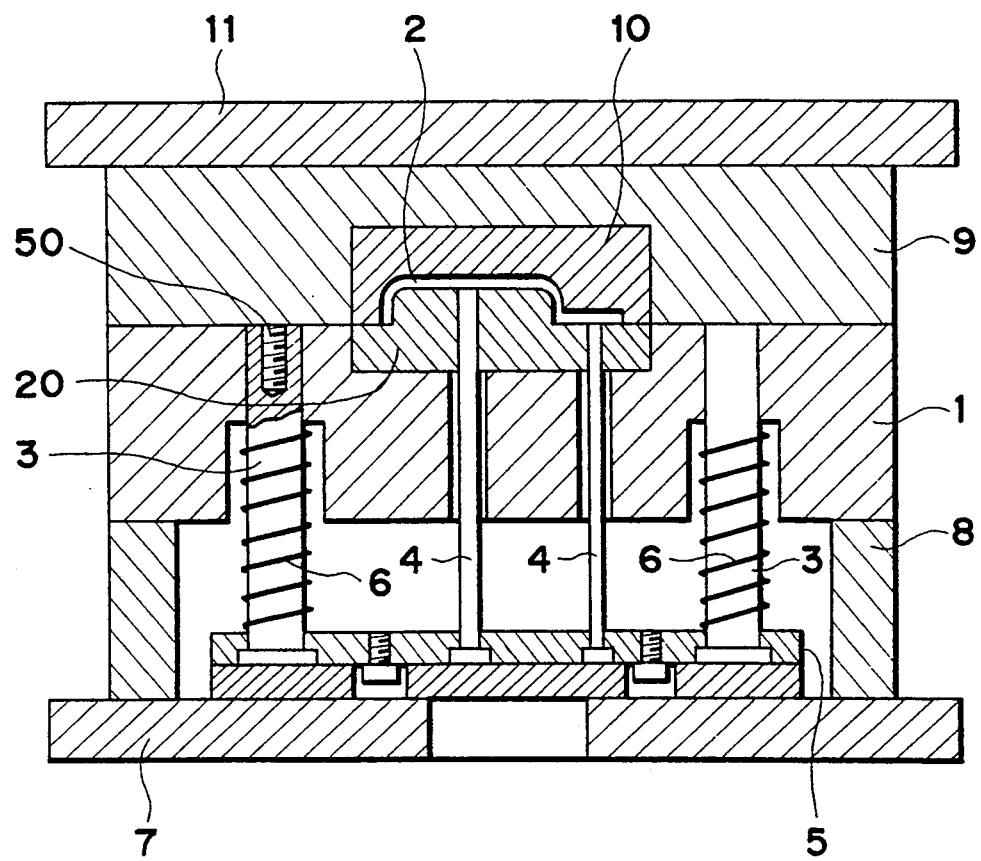
FIG. 1 is a vertical cross-sectional view of an embodiment of the mold of the present invention.

Now the present invention will be explained in more detail by embodiments thereof shown in FIGS. 1 to 6. In the mold shown in FIG. 1, adapted for use in an injection molding apparatus, a movable mold plate 1 is provided in opposed relationship to a fixed mold plate 9, and return pins 3 are slidably fitted in sliding holes 1A provided in the movable mold plate 1, and extend through the movable mold plate 1 so that the ends of the return pins 3 face the fixed mold plate 9. Between an ejector plate 5 for supporting ejector pins 4 and the movable mold plate 1, there are provided return springs 6, respectively, around the returns pins 3. At the end of said return pin 3, there is formed a threaded hole 50 for fitting a male screw 51 to be explained later.

In the present embodiment, the fixed mold plate 9 is mounted, through a fixed side mounting plate 11, to an operation member (not shown) of the injection molding apparatus, while the movable mold plate 1 is mounted, through a spacer block 8, to a movable side mounting plate 7. Cavity cores (mold members) 10, 20 each provided on the mold plates 9, 1 define a cavity 2 having a desired shape. The ejector plate 5 is composed of mutually superposed plates 5a, 5b. The ejector pins 4 extending from the ejector plate 5 toward the mold plate 1 pass through the through holes 1B, respectively, formed therein and have ends coinciding with the upper face of the cavity core 20.

In the above-explained mold, the fitting length T of said sliding hole 1A is so determined as to retain the mutual fitting of a predetermined length when the elastic force of the return spring 6 is released to a practically safe level. The male screw 51, when fitted into the threaded hole 50 from the fixed side through said sliding hole 1A, causes the return pin 3 to move in the sliding hole 1A due to its feeding function until the elastic force of the return spring 6 is released to a practically safe level.

More specifically, in the present embodiment, the length T of the sliding hole 1A is so determined as to satisfy a relation $T>L1+C$, where L1 is a maximum feeding length of the male screw 51 for moving the return pin 3 in the sliding hole 1A, and C is a minimum required length of fitting retained between the return pin 3 and the sliding hole 1A when the elastic force of said return spring 6 is released to a practically safe level. For the purpose of designing, the minimum required length C of fitting retained between the return pin 3 and the sliding hole 1A is preferably determined so as to satisfy a relation $C \geq D/2$ or $C \geq d$, where D is a diameter of the return pin 3, and d is a diameter of the male screw 51.

In the following there will be explained the molding operation with the above-explained mold. In a closed state of the mold shown in FIG. 1, molten plastic material is injected from a gate (not shown) into the cavity 2. The injected plastic material fills the cavity and is solidified to form a molded product. Subsequently, the mold is opened, and the ejector plate 5 is forced upwards by pressing means (not shown) whereby the ejector pins 4 pushes the molded product out from the upper face of the cavity core 20.

In the following there will be explained a disassembling method of the present invention, for the above-explained mold, with reference to FIG. 2. The disassembling assembling apparatus has to be equipped with the male screw 51 to be fitted into the threaded hole 50 formed on the end of said return pin 3, a spacer 52 to impinge on a surface of the movable mold plate 1 in an opposed relationship to the fixed side, and a nut 53 fitted on the male screw 51 for pressing the spacer 52 against the movable mold plate 1. Prior to the removal of the movable side mounting plate 7, the male screw 51, passed through the spacer 52 and nut 53 is screwed into the threaded hole 50 in such a state that the spacer 52 is supported on the movable mold plate 1. Then, the movable side mounting plate 7 is removed, but the ejector plate 5 is supported by the movable mold plate 1 by the male screw 51, spacer 52 and nut 53.

Subsequently, the nut 53 is rotated to move the male screw 51 into the sliding hole 1A gradually, thus moving slidably the return pin 3. In this manner the return spring 6 is relaxed and is eventually brought to a fully extended state. (This operation may be terminated even if certain compression remains in the return spring 6, as long as the elastic force thereof is in a practically safe level.) In this state the superposed plate 5b is removed, and the ejector pins 4 are removed. Therefore, the extraction of the ejector pins 4 can be executed safely. Also, if necessary, the male screw 51 is further moved to take out the return pin 3 from the sliding hole 1A, thereby disassembling the ejector plate 5 and the like safely.

Upon assembling, the male screw 51 is deeply inserted into the sliding hole 1A so that the front end of the male screw 51 is screwed into the threaded hole 50 of the return pin 3 on which the return spring 6 is fitted. In this state the nut 53 is rotated to gradually pull up the male screw 51, thereby pressing the return spring 6 (refer to FIG. 3). Subsequently, the ejector pins 4 are inserted into the through holes 1B of the mold plate 1 through the ejector plate 5a, then the plate 5b is superposed on said plate 5a, and the movable side mounting plate 7 is finally mounted on the mold plate 1 through the spacer blocks 8.

Figure 4:
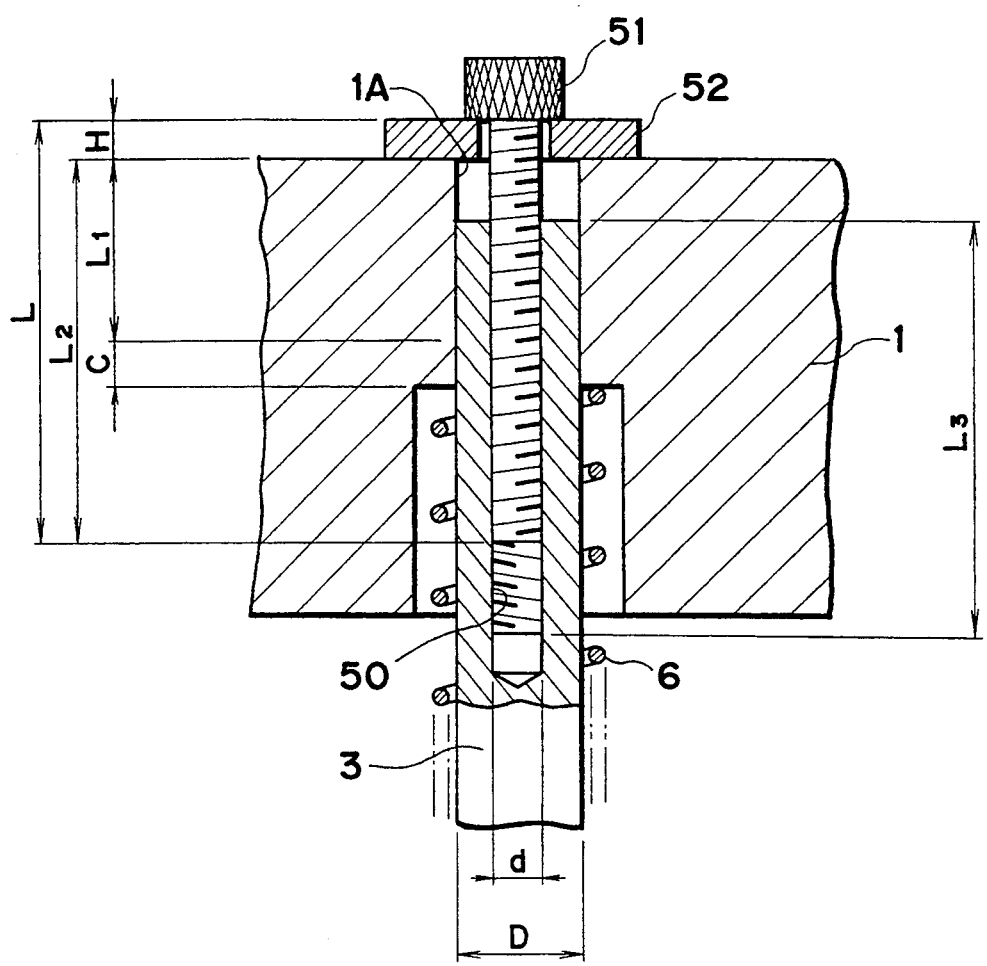
FIG. 4 is a partial vertical cross-sectional view of another embodiment of the mold of the present invention.

In the above-explained embodiment, the male screw 51 fitted in the threaded hole 50 of the return pin 3 is moved forward and backward in the sliding hole 1A by the rotation of the nut 53, but it is also possible, as shown in FIG. 4, to move the return pin 3 forward and backward in the sliding hole 1A by making the threaded hole 50 deeper and utilizing the screwing operation of the male screw 51.

In such case, the disassembling/assembling apparatus has to be equipped with the male screw 51 to be fitted in the threaded hole 50 formed on the end of the return pin 3, and a spacer 52 to contact with a surface of the movable mold plate 1 in an opposed relationship to the fixed side and to be pressed at the head portion of the male screw 51. At first, the male screw is rotated to fit the male screw 51 into the threaded hole 50 of the return pin 3, and is then rotated in the opposite direction to move the male screw 51 while maintaining the return pin 3 against the elastic force of the return spring 6, thereby releasing the elastic force to a practically safe level.

The effective thread length L of the male screw 51 is so determined as to satisfy relations $L=L2+H'$, $L<L3+H'$ and $T>L1+C$, where L1 is a maximum feeding length of the male screw 51 for moving the return pin 3 in the sliding hole, L2 is a fitted length of the male screw with the threaded hole 50 of the return pin 3 prior to said movement, L3 is a length of the threaded hole, H' is a thickness of the spacer, T is a length of the sliding hole 1A, and C is a minimum required length of the fitting remaining between the return pin and the sliding hole when the elastic force of the return spring 6 is released to the practically safe level.

Figure 5:
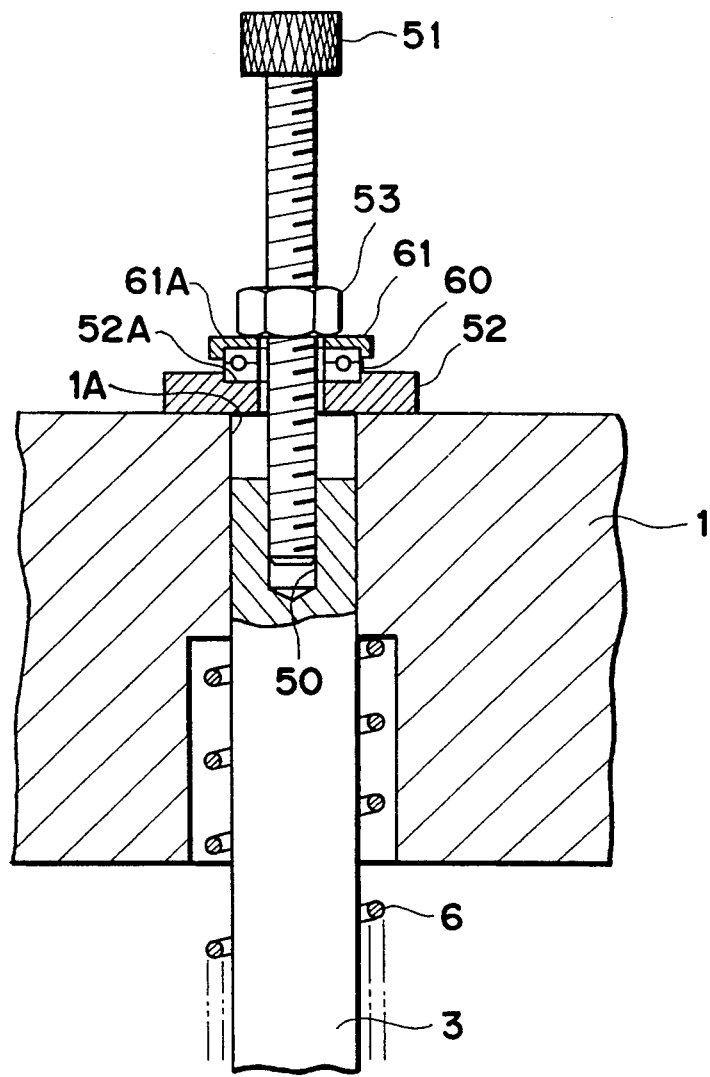
FIG. 5 is a partial vertical cross-sectional view of still another embodiment of the mold of the present invention.

Also, as shown in FIG. 5, a bearing 60 and a ring 61 may be provided between the nut 53 and the spacer 52 in order to reduce the friction resistance at the rotation of the nut 53. In such case, the spacer 52 and the ring 61 are preferably provided with seats 52A, 61A for accommodating the bearing 60, in order to facilitate the centering thereof.

Figure 6:
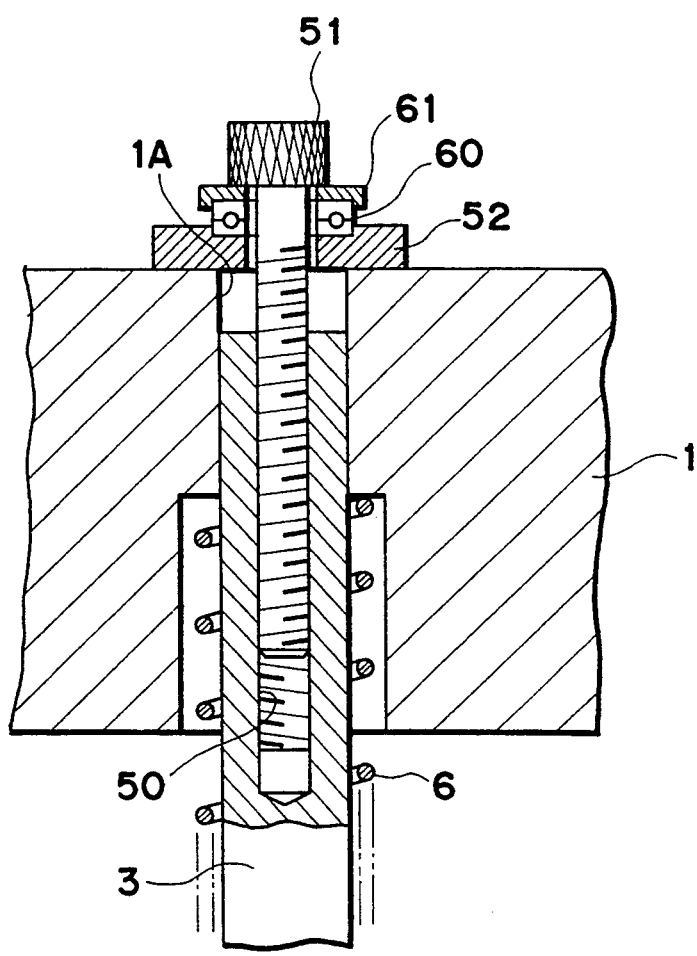
FIG. 6 is a partial vertical cross-sectional view of still another embodiment of the mold of the present invention.
Figure 7:
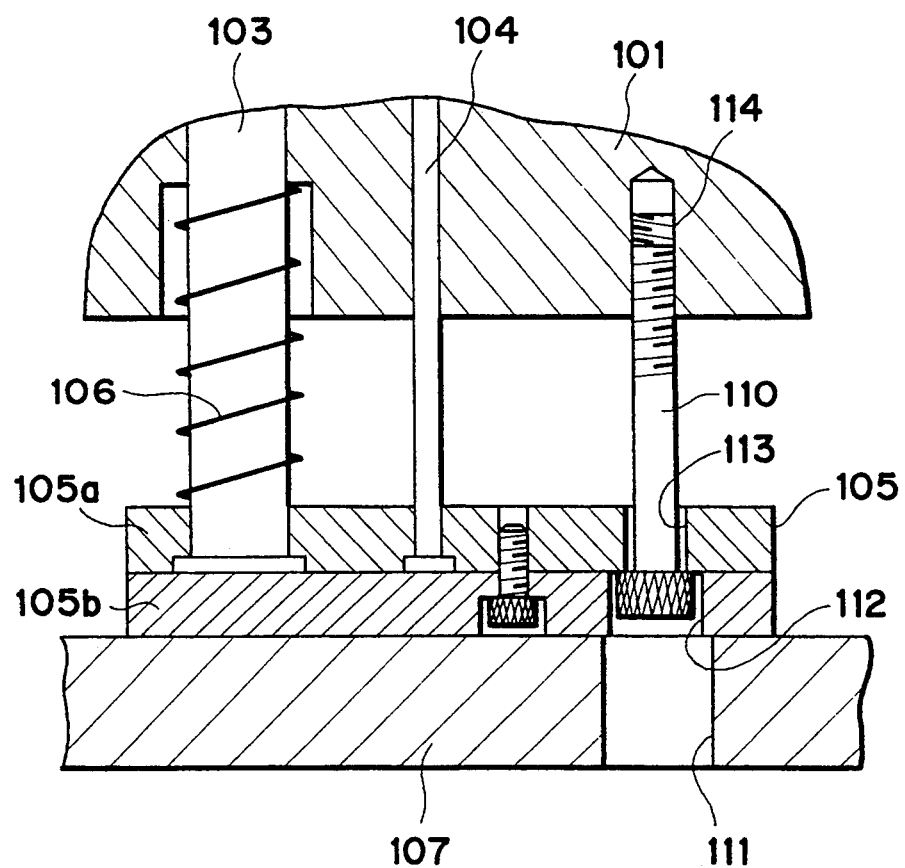
FIG. 7 is a vertical cross-sectional view of a conventional mold.

Also, in an embodiment shown in FIG. 6, the bearing 60 is positioned likewise between the spacer 52 and the ring 61, which is supported by the head portion 51A of the male screw 51. Also, in this case the forward and backward motions of the return pin 3 relative to the sliding hole 1A are achieved by screwing of the screw 51 into the threaded hole 50.

In the present invention explained in the foregoing, in a molding mold comprising a movable mold plate positioned opposite to a fixed mold plate, a return pin slidably fitted in and extending through a sliding hole provided in said movable mold plate and having the end positioned at the fixed mold plate, and a return spring provided between an ejector plate supporting an ejector pin and said movable mold plate, a male screw is screwed into a threaded hole formed on the end of said return pin and is rotated against the elastic force of said return pin to feed the return pin relative to the sliding hole in the movable mold plate so as to gradually reduce the elastic force of said return pin. Consequently, the return pin can be extracted from the sliding hole until the elastic force of the return spring is released to a practically safe level, and the extraction or insertion of the ejector pin can be safely executed in the reduced state of the elastic force. Also, if necessary, the return pin itself can be extracted or inserted in a state that the return spring is completely extended or relaxed to a practically safe level, without any particular working on the mold plates or other components. The disassembling and assembling of the mold can be executed safely and without danger of damaging the component parts.

Figure 2:
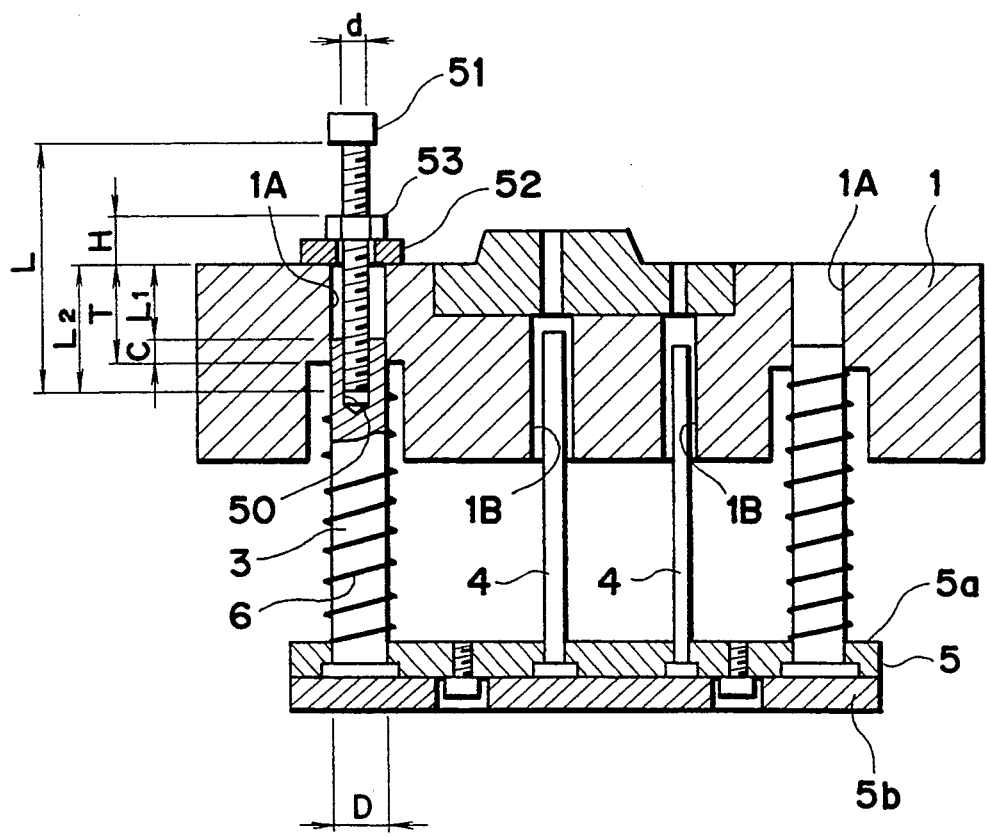
FIG. 2 is a partial vertical cross-sectional view of the mold, showing the disassembling operation of the present invention.
Figure 3:
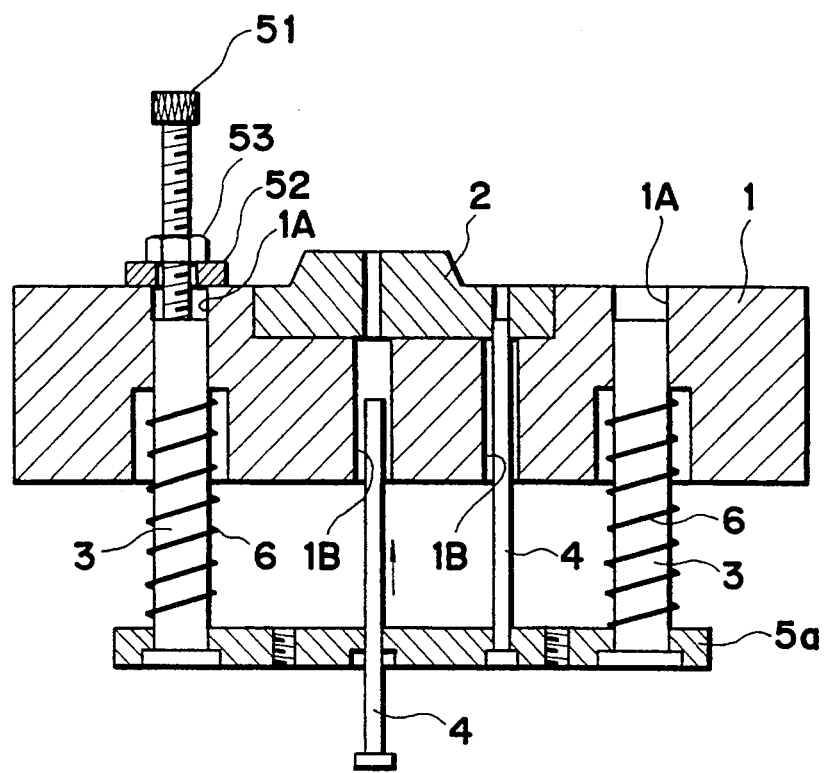
FIG. 3 is a partial vertical cross-sectional view of the mold, showing the assembling operation of the present invention.

Also, the present invention enables safe maintenance work by eliminating the force applied to the return pin 3 at the disassembling position shown in FIG. 2 in such a manner that the length of the screw 51 for eliminating the spring force is long enough to eliminate the spring force of the return spring 6.

In the molding of an article with a complex form, there are required plural ejector pins 4.

In case of maintenance work of the cavity core 20, which has to be detached from the mold plate 1, and after the maintenance work, the cavity core 20 is attached again to the mold plate 1 and the ejector pin 4 is inserted. In such case, according to the method and apparatus of the present invention, the insertion of the ejector pin can be performed in a state without the elastic force of the return spring 6 to continue the insertion gradually by the rotation of the screw 51, so that the pin 4 does not misengage with the hole formed in the mold member 23. It is therefore rendered possible to prevent damage in said pin or in the mold member 23.

Furthermore, the present invention is featured by comprising a screw member to be fitted in a threaded hole formed on the end of the return pin, wherein the screw member is rotated to feed the return pin in a direction to separate it from the mold plate, thus maintaining a sufficient distance between the ejector plate and the mold plate to reduce the elastic force of the return spring, whereby the component parts of the mold are protected from impact force or the like at the disassembling operation.

What is claimed is:

1. A method for assembling/disassembling a molding mold comprising the steps of:
   providing a molding mold having a fixed mold plate, a movable mold plate positioned opposite to the fixed mold plate, mold members mounted opposite to each other on the fixed and movable mold plates and defining a cavity therebetween, a return pin slidably fitted through a sliding hole in the movable mold plate and having a first end facing the fixed mold plate, a return spring disposed about said return pin, an ejector plate supporting a second end of the return pin, and an ejector pin supported on the ejector plate and axially movable through an opening in the movable mold plate to extend into the cavity,
   providing a screw member with a threaded shaft insertable into the sliding hole in the movable mold plate;
   exposing the first end of the return pin;
   inserting the screw member in the sliding hole and into a threaded opening of a predetermined depth at the first end of the return pin to engage the return pin; and
   axially feeding the screw member to effect relative movement between the return pin and the moving mold plate to regulate the elastic force of the return spring, wherein a length of the screw member fed in the sliding hole is longer than the depth of the opening in the return pin.

2. The method for assembling/disassembling a molding mold as set forth in claim 1, further comprising the steps of feeding the screw in a first direction to force the return pin to withdraw from the hole in the movable mold plate and reduce the elastic force of the return spring.

3. The method for assembling/disassembling a molding mold as set as set forth in claim 2, further comprising the steps of:
removing part of the ejector plate to access the ejector pin;
removing the ejector;
removing the screw from the return pin, and
removing the return pin from the movable mold plate member.

4. The method for assembling/disassembling a molding mold as set forth in claim 1, further comprising the step of feeding the screw in a second direction to draw the return pin into the hole in the movable mold plate and increase the elastic force on the return spring.

5. A method for disassembling a molding mold comprising the steps of:
providing a molding mold having first and second mold members defining a cavity for molding a product, movable and fixed mold plates for supporting the first and second mold members, respectively, an mounting members mounted on the mold plates, an ejector pin insertable through the movable mold plate and the first mold member for ejecting the molded product, an ejector plate for supporting the ejector pin, a return pin mounted on the ejector plate and having a first end extending through a hole provided in the movable mold plate positioned at an interface with the fixed mold plate, and a return spring for applying an elastic force to the return pin,
providing screw member with a threaded shaft insertable into the hole in the movable mold plate;
removing the first mounting member and the fixed mold plate to expose the first end of the return pin,
inserting the screw member in the hole in the movable mold plate and into a threaded hole of a predetermined depth provided in the first end of the return pin, the screw member being supported on the movable mold plate,
axially feeding the screw member to effect relative movement between the return pin and the movable mold plate to reduce the elastic force of the return spring, wherein a length of the screw member fed into the hole is greater than the depth of the threaded hole in the return pin; and
detaching the ejector pin from the mold member while the elastic force of the return spring is reduced or eliminated.

6. A method for disassembling a molding mold comprising the steps of:
providing a molding mold having first and second mold members forming a cavity for molding a product, movable and fixed mold plate members for supporting the first and second mold members, respectively, an ejector pin insertable through a first opening in the movable mold plate member and the first mold member for ejecting the molded product, an ejector plate for supporting the ejector pin, a return pin mounted on the ejector plate and having one end extending through a second opening in the movable mold plate member and positioned at an interface with the fixed mold plate member, and a return spring for applying an elastic force to the return pin,
providing a screw member with a threaded shaft insertable in the first opening;
exposing the one end of the return pin;
inserting a screw member in the first opening and into a threadable hole in the one end of the return pin to secure the return pin to the movable mold plate member;
supporting the screw member on the movable mold plate member; and
axially feeding the screw member to effect relative movement between the return pin and the movable mold member to reduce the elastic force of the return spring, wherein a length of screw member fed into the hole is greater than the depth of the threaded hole in the return pin.

7. The method for disassembling a molding mold as set forth in claim 6, further comprising the step of removing the ejector pin from the movable mold plate member after the elastic force of the return spring has been reduced.

8. The method for disassembling a molding mold as set forth in claim 7, further comprising the step of removing the screw member from the return pin and detaching the return pin from the movable mold plate member.

* * * * *

UNITED STATES PATENT AND TRADEMARK OFFICE
CERTIFICATE OF CORRECTION

PATENT NO. : 5,359,764
DATED : November 1, 1994
INVENTOR(S) : Sasaki et al.

It is certified that error appears in the above-indentified patent and that said Letters Patent is hereby corrected as shown below:

[75] INVENTORS: Title page, item

"Shigeo Negataki," should read --Shigeo Nagataki,--.

COLUMN 1:

Line 61, "particular" should read --any particular--.

COLUMN 2:

Line 20, "invention," should read --invention--.

COLUMN 7:

Line 30, "an" should be deleted.
Line 40, "screw" should read --a screw--.

COLUMN 8:

Line 28, "threadable" should read --threaded--.

Signed and Sealed this

Thirtieth Day of May, 1995

Attest:

BRUCE LEHMAN

Attesting Officer   Commissioner of Patents and Trademarks